(12) United States Patent
Gutierrez et al.

(10) Patent No.: US 10,106,750 B2
(45) Date of Patent: Oct. 23, 2018

(54) PROCESS FOR UPGRADING PYROLYSIS OIL, TREATED PYROLYSIS OIL AND THE USE THEREOF

(71) Applicant: UPM-KYMMENE CORPORATION, Helsinki (FI)

(72) Inventors: Andrea Gutierrez, Lappeenranta (FI); Pekka Jokela, Espoo (FI); Jaakko Nousiainen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 605 days.

(21) Appl. No.: 14/384,790

(22) PCT Filed: Mar. 14, 2013

(86) PCT No.: PCT/FI2013/050292
§ 371 (c)(1),
(2) Date: Sep. 12, 2014

(87) PCT Pub. No.: WO2013/135973
PCT Pub. Date: Sep. 19, 2013

(65) Prior Publication Data
US 2015/0059354 A1    Mar. 5, 2015

(30) Foreign Application Priority Data

Mar. 16, 2012 (FI) ..................... 20125294

(51) Int. Cl.
*C10G 65/04* (2006.01)
*C10G 3/00* (2006.01)
(Continued)

(52) U.S. Cl.
CPC ............ *C10G 65/04* (2013.01); *C10G 3/40* (2013.01); *C10G 3/50* (2013.01); *C10G 45/02* (2013.01);
(Continued)

(58) Field of Classification Search
CPC . C10G 65/04; C10G 3/40; C10G 3/50; C10G 45/02; C10G 45/44; C10G 47/00;
(Continued)

(56) References Cited

U.S. PATENT DOCUMENTS 4,795,841 A  1/1989 Elliott et al.
7,578,927 B2  8/2009 Marker et al.
(Continued)

FOREIGN PATENT DOCUMENTS

GB          335543 A        9/1930
WO       2010139854 A1    12/2010
WO      20110020966 A1    2/2011

OTHER PUBLICATIONS

Mercader et al., "Competition Between Hydrotreating and Polymerization Reactions During Pyrolysis Oil Hydrodeoxygenation", American Institute of Chemical Engineers, 2011, vol. 57, No. 11, pp. 3160-3170.

(Continued)

*Primary Examiner* — Phutthiwat Wongwian
*Assistant Examiner* — Loren Edwards
(74) *Attorney, Agent, or Firm* — Cantor Colburn LLP

(57) ABSTRACT

A process for upgrading pyrolysis oil that includes heating pyrolysis oil in the absence of added catalyst at 100° C. to 200° C. temperature and 50 bar to 250 bar pressure, and heating the product of the first heating in the absence of added catalyst at 200° C. to 400° C. temperature and 50 bar to 250 bar pressure. Also, the product obtained by this process and the use of treated pyrolysis oil. Further, methods where the treated pyrolysis oil is fed to a power plant for producing electricity; is burned in a boiler for producing heating oil and/or is used as transportation fuel or as a blending component in transportation fuel.

18 Claims, 2 Drawing Sheets

(51) Int. Cl.
| | |
|---|---|
| C10G 45/02 | (2006.01) |
| C10G 45/44 | (2006.01) |
| C10G 47/00 | (2006.01) |
| C10G 53/02 | (2006.01) |
| C10G 65/12 | (2006.01) |
| C10G 67/02 | (2006.01) |
| C10L 1/04 | (2006.01) |
| C10L 1/16 | (2006.01) |
| F02C 3/24 | (2006.01) |
| C10C 5/00 | (2006.01) |

(52) U.S. Cl.
CPC ............ *C10G 45/44* (2013.01); *C10G 47/00* (2013.01); *C10G 53/02* (2013.01); *C10G 65/12* (2013.01); *C10G 67/02* (2013.01); *C10L 1/04* (2013.01); *C10L 1/1616* (2013.01); *F02C 3/24* (2013.01); *C10C 5/00* (2013.01); *C10G 2300/1011* (2013.01); *C10L 2200/0469* (2013.01); *C10L 2270/023* (2013.01); *C10L 2270/026* (2013.01); *C10L 2290/08* (2013.01); *Y02E 50/14* (2013.01); *Y02P 30/20* (2015.11)

(58) Field of Classification Search
CPC ........ C10G 53/02; C10G 65/12; C10G 67/02; C10G 2300/1011; C10L 1/04; C10L 1/1616; C10L 2200/0469; C10L 2270/023; C10L 2270/026; C10L 2290/08; F02C 3/24; Y02P 30/20; C10C 5/00
USPC ......................................................... 60/780
See application file for complete search history.

(56) References Cited

U.S. PATENT DOCUMENTS

| | | | |
|---|---|---|---|
| 7,819,930 B2 * | 10/2010 | Adams | C10G 1/02 208/14 |
| 8,217,210 B2 * | 7/2012 | Agrawal | C10B 49/22 48/127.7 |
| 8,912,376 B2 * | 12/2014 | Preau | C01B 3/38 44/605 |
| 2011/0119994 A1 | 5/2011 | Hogendoorn et al. | |
| 2011/0232163 A1 | 9/2011 | Siskin et al. | |
| 2012/0055077 A1 * | 3/2012 | Savage | C10L 1/02 44/307 |
| 2012/0203044 A1 | 8/2012 | Preau | |

OTHER PUBLICATIONS

Mercader et al., "Pyrolysis oil upgrading by high pressure thermal treatment", Fuel, 2010, vol. 89, pp. 2829-2837.

Mortensen et al., "A review of catalytic upgrading of bio-oil to engine fuels", Applied Catalysis A: General, 2011, vol. 407, pp. 1-19.

Sharma et al., "Conversion of Non-Phenolic Fraction of Biomass-Derived Pyrolysis Oil to Hydrocarbon Fuels Over HZSM-5 Using a Dual Reactor System", Bioresource Technology, 1993, vol. 45, pp. 195-203.

Srinivas et al., "Thermal and Catalytic Upgrading of a Biomass-Derived Oil in a Dual Reaction System", The Canadian Journal of Chemical Engineering, 2000, vol. 78, No. 2, pp. 343-354.

Venderbosch et al., "Stabilization of biomass-derived pyrolysis oils", Journal Chem. Technol. Biotechnol., 2010, vol. 85, pp. 674-686.

Wildschut, Jelle, "Pyrolysis Oil Upgrading to Transportation Fuels by Catalytic Hydrotreatment", Dissertation, http://dissertations.ub.rug.nl/FILES/faculties/science/2009/j.wildschut/thesis.pdf, Chapter 1: An introduction to the hydroprocessing of biomass derived pyrolysis oil, 2009, pp. 19-49.

Finnish Search Report, dated Nov. 30, 2012, from corresponding FI application.

International Search Report, dated Aug. 2, 2013, from corresponding PCT application.

\* cited by examiner

PROCESS FOR UPGRADING PYROLYSIS OIL, TREATED PYROLYSIS OIL AND THE USE THEREOF

FIELD OF THE INVENTION

The present invention relates to a process for upgrading pyrolysis oil, comprising the steps of first heating the pyrolysis oil in the absence of added catalyst at 100° C. to 200° C., preferably 100° C. to 150° C. temperature and 50 bar to 250 bar, preferably 150 to 200 bar pressure and thereafter heating the product of the previous step in the absence of added catalyst at 200° C. to 400° C., preferably 300° C. to 350° C. temperature and 50 bar to 250 bar, preferably 150 to 200 bar pressure.

The invention further relates to a product obtained by the process according to the process of the invention and thereto to the use of treated pyrolysis oil obtained according to the process of the invention for heating; in power plants; for hydrodeoxygenation and/or as transportation fuel or as a blending component in transportation fuel, preferably in gasoline or diesel fuel.

Further the present invention describes methods where the treated pyrolysis oil according to any process of the invention is fed to a power plant for producing electricity; is burned in a boiler for producing heating oil and/or is used as transportation fuel or as a blending component in transportation fuel, preferably in gasoline or diesel fuel.

BACKGROUND OF THE INVENTION

The diminishing reserves of fossil fuels and the emission of harmful gases connected with their use have increased the interest in utilizing organic materials, especially non-edible renewable resources, for making liquid fuels capable of replacing fossil ones.

One of the existing processes for the conversion of biomass includes pyrolysing lignocellulosic material obtained from biomass to obtain pyrolysis oil. Pyrolysis is a process for thermal conversion of solid fuels in the complete absence or with limited supply of oxidizing agent such as air or oxygen. Commercial applications are either focused on the production of charcoal (slow pyrolysis) or production of a liquid product (fast pyrolysis), the pyrolysis oil. Especially the latter is potentially interesting as a substitute for fuel oil and as a feedstock for the production of synthetic gasoline kerosene, jet fuel or diesel fuel.

During pyrolysis, which takes place at temperatures in the range 400-700° C., most of the cellulose and hemicellulose and part of the lignin will disintegrate to form smaller and lighter molecules which are gases at the pyrolysis temperature. As these gases cool, some of the vapors condense to form a liquid, called pyrolysis oil. The remaining part of the biomass, mainly parts of the lignin, is left as a solid i.e. the charcoal.

Conventional slow pyrolysis has been used for thousands of years for the production of charcoal. Pyrolysis temperatures of around 500° C. are used in the slow pyrolysis of wood, and both solid char and liquid are formed. In fast pyrolysis the biomass is rapidly heated and it decomposes in vapors, aerosols, and some charcoal-like char. The cooling of the vapors and aerosols yields pyrolysis oil that has a heating value that is about half of that of conventional fuel oil.

Depending on the feedstock, fast pyrolysis produces about 60-70 wt % liquid pyrolysis oil, 15-25 wt % of solid char and 10-20 wt % of non-condensable gases. In principal no waste is generated as the char and liquid pyrolysis oil can be used as fuels and the gas can be recycled into the process. However, due to its instability the liquid pyrolysis oil is difficult to use as such. It can be used to replace heavy heating oil in, for example, industrial boilers, but in order to be able to use it as transportation fuel, it needs to be upgraded before use as fuel. Therefore several processes for additional processing of pyrolysis oil have been suggested in the literature.

US 2011/0119994 relates to catalytic hydrotreatment of pyrolysis oil where feed comprising pyrolysis oil is subjected to a hydrodeoxygenation step in the presence of a catalyst. U.S. Pat. No. 7,578,927 discloses diesel production from pyrolytic lignin where pyrolytic lignin is hydrotreated and the hydrocracking unit includes a catalyst. In U.S. Pat. No. 4,795,841 pyrolyzate oil is exposed to hydrogen gas and a suitable catalyst at a temperature in the range of 250° C. to 300° C.

Despite the ongoing research and development of processes for upgrading pyrolysis oil, there is still a need to provide an improved process for treating pyrolysis oil.

SUMMARY OF THE INVENTION

The present invention relates to a process for upgrading pyrolysis oil where the pyrolysis oil is first heated in the absence of any added catalyst at a temperature from 100° C. to 200° C., preferably from 100° C. to 150° C. and a pressure from 50 bar to 250 bar, preferably from 150 to 200 bar and whereafter the product of the previous step is heated in the absence of any added catalyst at a temperature from 200° C. to 400° C., preferably from 300° C. to 350° C. and a pressure from 50 bar to 250 bar, preferably from 150 to 200 bar.

The present invention also relates to a product obtained by the process according to the invention.

Further the invention on hand provides a method for producing electricity wherein said treated pyrolysis oil according to the process of the invention is fed to a power plant; a method for producing heating oil wherein said treated pyrolysis oil according to the process of the invention is burned in a boiler and a method for producing fuel for transportation wherein the treated pyrolysis oil according to the process of the invention is used as transportation fuel or as a blending component in transportation fuel. Typically the treated pyrolysis oil of the invention is used as a blending component in transportation fuel such as gasoline or diesel fuel.

The invention on hand also relates to the use of treated pyrolysis oil obtained according to the process of the invention for heating; in power plants; in diesel engines, for hydrodeoxygenation and/or as transportation fuel or as a blending component in transportation fuel, preferably in gasoline or diesel fuel.

An object of the present invention is to provide a process for upgrading pyrolysis oil which process is cheaper and easier to operate than prior art processes. It was surprisingly found out that the reactions in pyrolysis oil upgrading are possible to bring about without any added catalyst. In the process of the invention there is no need to use any added catalyst. Previously the catalyst has been considered to be important and play a key role. In practice a catalyst is deactivated or poisoned by impurities of the pyrolysis oil or be influenced by coke deposits, and needs to be either changed or activated from time to time. In addition, the catalyst is very sensitive to any changes in the process or in the pyrolysis oil composition. Any disturbances in the process or changes in the pyrolysis oil composition may lead to fast poisoning of the catalyst resulting in additional expenses and thereto breaks in the production.

Another object of the invention is to provide treated pyrolysis oil of improved quality which can more easily be transported, processed further or mixed with other materials without handling problems fir example in refinery.

A further object of the process of the invention is removing unstable molecules. Typically the most reactive compounds will react during the first step and due to the low temperature they will not coke. During the higher temperatures of the second step the more resistant compounds react.

One embodiment of the invention relates to carrying out the thermal processing under reducing conditions. A gas atmosphere comprising at least one of carbon monoxide, hydrogen, nitrogen or mixtures thereof are used. The use of different atmospheres makes it possible to easily enhance different reactions during the process and/or to control the properties of the upgraded pyrolysis oil product and the amount of separated water.

DETAILED DESCRIPTION OF THE INVENTION

Figure 1:
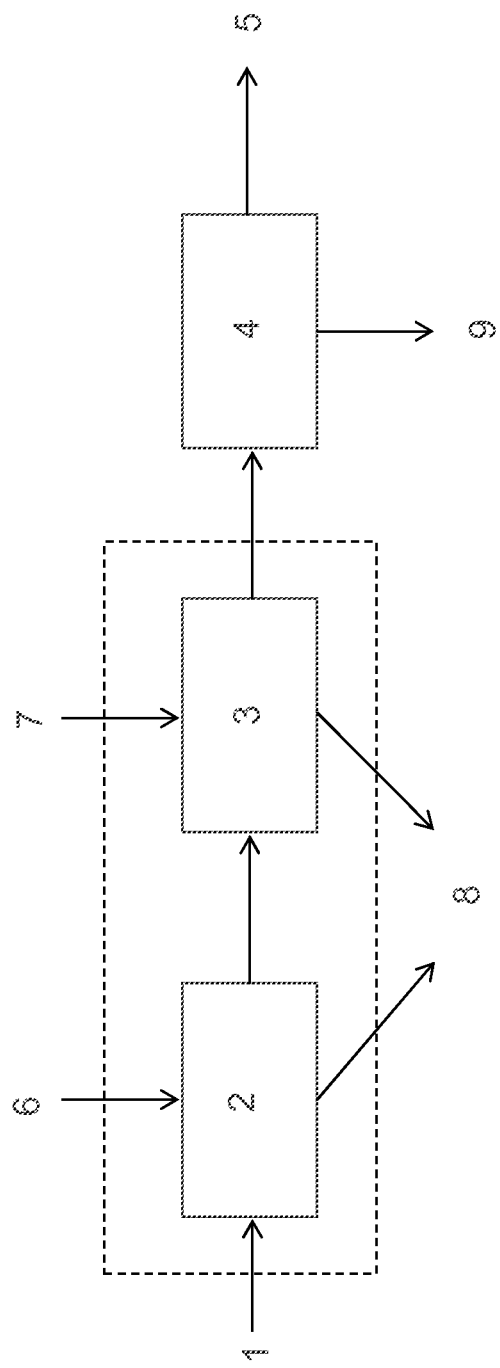
FIG. 1 is a schematic flow diagram representing one embodiment of the invention for upgrading pyrolysis oil.

The present invention relates to a non-catalytic process for upgrading pyrolysis oil comprising heating pyrolysis oil in the absence of added catalyst at 100° C. to 200° C. temperature and 50 bar to 250 bar pressure, and heating the product of the first heating in the absence of added catalyst at 200° C. to 400° C. temperature and 50 bar to 250 bar pressure. The present invention also relates to the product obtained by the process according to the invention and further describes methods where the treated pyrolysis oil according to any process of the invention is used is fed to a power plant for producing electricity; is burned in a boiler for producing heating oil and/or is used as transportation fuel or as a blending component in transportation fuel, preferably in gasoline or diesel fuel.

The invention on hand also relates to the use of treated pyrolysis oil obtained according to the process of the invention for heating; in power plants; in diesel engines; for hydrodeoxygenation and/or as transportation fuel or as a blending component in transportation fuel, preferably as a blending component in gasoline or diesel fuel.

In the present specification and claims, the following terms have the meanings defined below.

The term "pyrolysis oil" refers to a synthetic fuel under investigation as a substitute or a complement for example transportation fuel. It is typically extracted by biomass to liquid technology of destructive distillation from dried biomass in a reactor at temperature of about 400° C. to 700° C. with subsequent cooling. Usually temperatures of about 460° C. to 520° C. yield most liquid. Basically biomass is split into solid and gaseous components under the influence of heat only (anhydrous pyrolysis). The solid component, charcoal, may be used for heating the process, a soil additive (biochar), or as activated carbon in absorption processes. The non-condensable gaseous component, comprising hydrogen ($H_2$), carbon monoxide (CO), carbon dioxide ($CO_2$) and methane ($CH_4$), may be burned. The condensable gases, however, may be rapidly cooled to form condensate droplets, which can then be separated from the non-condensable gases due to the substantial difference in density of each fraction. The pyrolysis oil is sometimes called bio-oil.

The term "non-catalytic" refers to a process where no heterogeneous or homogeneous catalyst is added to the process and where the reaction(s) take place in the absence of an added catalyst. Typically this means in practice that the reaction(s) take place, only between the materials fed into the reactor(s) and the reagents formed during the reaction(s), without adding for example a commercial catalyst.

The term "heterogeneous catalyst" refers to heterogeneous catalysis, where the catalyst, such as a metal catalyst, is in a different phase than the reactants. It is the opposite of homogeneous catalysis which usually refers to a sequence of reactions that involve a catalyst in the same phase as the reactants.

The term "biomass material" refers to plant biomass that is composed of cellulose and hemicellulose, and lignin. Biomass comes in many different forms, which may be grouped into four main categories: wood and wood residues, including sawmill and paper mill discards, municipal paper waste, agricultural residues, including corn stover (stalks and straw) and sugarcane bagasse, and dedicated energy crops, which are mostly composed of tall, woody grasses.

The raw material for the pyrolysis oil production is biomass material. The biomass is typically selected from virgin and waste materials of plant, animal and/or fish origin, such as virgin wood, municipal waste, industrial waste or by-products, agricultural waste or by-products (including also dung), virgin wood, waste, residues or by-products of the wood-processing industry, waste or by-products of the food industry, and combinations thereof. The biomass material is preferably selected from non-edible resources such as non-edible wastes and non-edible plant materials. A preferred biomass material according to the present invention comprises waste and by-products of the wood-processing industry such as slash, urban wood waste, lumber waste, wood chips, wood waste, sawdust, straw, firewood, wood materials, paper, by-products of the papermaking or timber processes, etc.

The oil produced in a pyrolysis process (pyrolysis oil) is acidic, with a pH of 1.5-3.8, typically between pH 2 and 3. While the exact composition of pyrolysis oil depends on the biomass source and processing conditions, a typical composition is as follows: Water 20-28%; Suspended solids and pyrolitic lignin 22-36%; Hydroxyacetaldehyde 8-12%; Levoglucosan 3-8%; Acetic acid 4-8 Acetol 3-6%; Cellubiosan 1-2%; Glyoxal 1-2%; Formaldehyde 3-4%; Formic Acid 3-6%. The density is approximately 1.2-1.3 kg/l and usually the water molecules which are split during pyrolysis stay bound within the complex pyrolysis liquid as an emulsion. The pyrolysis oil is immiscible in mineral oil and mineral derived products as such and it cannot be blended with solvents or oils whose polarity is too low, like diesel fuel and that is one reason why the pyrolysis oil needs to be further treated or upgraded. One typical composition of wood-based wet pyrolysis oil is described in Table 1 and a typical composition of dry matter (wt-%) of pyrolysis oil in Table 2. In Table 2 the "Others" are mainly other organics and eventually small amounts of inorganics. Another way of describing the composition of wood-based wet pyrolysis oil is shown in Table 3.

TABLE 1

Typical composition of wood-based wet pyrolysis oil

| Component | wet PO (wt-%) |
|---|---|
| Water | 23.9 |
| Acids | 4.3 |
| Alcohols | 2.2 |
| Aldehydes, ketones, furans, pyranes | 15.4 |
| Sugars | 34.4 |
| LMM lignin (low molecular mass lignin) | 13.4 |
| HMM lignin (high molecular mass lignin) | 1.95 |
| Extractives | 4.35 |

TABLE 2

Typical composition of dry matter (wt-%) of pyrolysis oil

| Component | dry PO (wt-%) |
|---|---|
| Aliphatic carboxylic acids | 5.6 |
| Formic | 1.5 |
| Acetic | 3.4 |
| Propionic | 0.2 |
| Glycolic | 0.6 |
| Lignin | 20.3 |
| Extractives | 5.7 |
| Others | 68.5 |

TABLE 3

Typical composition of wood-based wet pyrolysis oil

| Component | wet PO |
|---|---|
| Moisture content, wt-% | 15-30 |
| pH | 2.5 |
| Specific gravity | 1.2 |
| Elemental composition, wt-% | |
| Carbon | 54-58 |
| Hydrogen | 5.5-7.0 |
| Nitrogen | 0-0.2 |
| Ash | 0-0.2 |
| Higher heating value, MJ/kg | 16-19 |
| Viscosity (50° C.), cP | 40-100 |
| Solids, wt-%: | 0.2-1 |
| Distillation residue, wt-%: | up to 50 |

WO2010/139854 A1 describes methods for producing pyrolysis oil wherein one embodiment comprises carrying out the pyrolysis process in connection with a fluidized bed boiler wherein the solid fuel is supplied into a drying zone of the pyrolysis reactor; the solid fuel is dried in the drying zone and moisture-containing gases from the solid fuel are removed. The dried solid fuel is passed to the pyrolysis zone of the pyrolysis reactor; pyrolysis gases of the dried solid fuel are pyrolysed and separated; and the pyrolysis gases are conducted to a condenser for the production of pyrolysis oil.

Although a method for the production of pyrolysis oil is described above, the present invention is not limited to pyrolysis oil produced by this method.

According to one embodiment of the invention, the process of the invention comprises at least two steps for treating pyrolysis oil. The temperature of the first step (a) is adjusted to a temperature from 100° C. to 200° C., more preferably from 100° C. to 150° C., including the temperature being between two of the following temperatures; 100° C., 105° C., 110° C., 120° C., 125° C., 130° C., 140° C., 150° C., 160° C., 170° C., 180° C., 190° C. and 200° C. for the heating of the pyrolysis oil. At the same time the pressure is adjusted to a pressure from 50 bar to 250 bar, more preferably from 150 bar to 200 bar, including the pressure being between two of the following pressures; 50 bar, 60 bar, 70 bar, 80 bar, 90 bar, 100 bar, 110 bar, 120 bar, 130 bar, 140 bar, 150 bar, 160 bar, 170 bar, 180 bar, 190 bar, 200 bar, 210 bar, 220 bar, 230 bar, 240 bar and 250 bar.

The temperature of a second later step (b) is adjusted to a temperature from 200° C. to 400° C., more preferably from 300° C. to 350° C., including the temperature being between two of the following temperatures; 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C. and 400° C. for the heating of the product of the first step (step a). At the same time the pressure is adjusted to a pressure of 50 bar to 250 bar, more preferably 150 bar to 200 bar, including the pressure being between two of the following pressures; 50 bar, 60 bar, 70 bar, 80 bar, 90 bar, 100 bar, 110 bar, 120 bar, 130 bar, 140 bar, 150 bar, 160 bar, 170 bar, 180 bar, 190 bar, 200 bar, 210 bar, 220 bar, 230 bar, 240 bar and 250 bar.

One embodiment of the invention relates to the most reactive compounds reacting during the first step. Due to the low temperature during the first step they will not directly coke. Typically the first step comprises hydrogenation of for example acids, aldehydes, alcohols and/or sugars. Further the higher temperatures of the second step cause the more resistant compounds to react. Typically the second step comprises oxygen removal of for example lignin and/or lignin derived phenolics. The heating media used in the different embodiments of the invention are typically direct heat, different kinds of heat exchangers etc. The heating rate of the first and second heating is typically between two of the following rates; 2, 3, 4, 5, 6, 7, 8, 9, 10, 11, 12, 13, 14 and 15° C./min. The heating time of the first and second step depends on the heating rate and varies between two of the following periods of time; 20, 25, 30, 45, 60, 90, 120, 150 and 180 minutes.

In one embodiment of the invention at least one of the process steps is performed in a gas atmosphere comprising at least one of carbon monoxide, hydrogen, nitrogen or mixtures thereof. The use of different gas atmospheres typically leads to differences in the process and the products. The use of CO typically causes decarbonylation and decarboxylation and eventually some hydrogenation and thermal cracking. The acid functionality breaks and adding $H_2$ typically leads to the formation of methane and a larger amount of water. The use of $H_2$ typically causes mainly hydrogenation reactions and also thermal cracking, carbonylation, and decarboxylation. The use of an inert $N_2$ atmosphere typically leads to less water being separated and causes thermal cracking and some hydrogenation and eventually decarboxylation and decarbonylation. Although $H_2$ is not added separately, the pyrolysis oil itself comprises enough hydrogen donors in order for the reactions to take place.

According to further embodiments of the invention, the steps a) and/or b) are carried out under a gas atmosphere comprising at least one of carbon monoxide, hydrogen, nitrogen or mixtures thereof. The gas atmosphere is preferably carbon monoxide, most preferably a mixture of carbon monoxide and hydrogen.

According to different embodiments of the invention, the steps of the process of the invention are carried out in one single reactor or in separate reactors under the same or different gas atmosphere. The process is either batch-type or continuous. If the process is continuous, the pressure is typically the same during both heating steps, but the temperatures are different.

In typical reactions of the different embodiments of the invention, unstable molecules including oxygen are removed from the pyrolysis oil and/or the chemical functionality of the oxygen that is not removed changes into a more stable chemical structure making the oil more stable over time. The functionality of the oxygenated groups changes and the acidic, oxygen-containing compounds of the pyrolysis oil and the chemically-bound water react.

In one embodiment of the invention water which is bound within the complex pyrolysis liquid is separated during the process. Water is typically separated from the intermediate or final product together with water-soluble compounds together forming a water phase. Such compounds are for example formic acids, hydroxyl acids, alcohols, aldehydes, ketones and sugars. Alternatively, the water or the water phase is utilized in other processes. Another embodiment of the invention relates to separating a gas phase comprising light hydrocarbons such as methane, ethane and propane as gases.

According to other embodiments of the invention, the process of the invention further comprises one or more of the following steps; a step separating the water phase from the oil phase, intermediate or final product; separating a gas phase; washing treatment; filtering; cooling; a step of recovering treated pyrolysis oil; hydrotreating treated pyrolysis oil; a step of mixing treated or hydrotreated pyrolysis oil with mineral oil or transportation fuel; refining and/or fractionation of treated or hydrotreated pyrolysis oil. These embodiments can be used in combination with all the different embodiments of the invention.

In one embodiment of the invention the treated pyrolysis oil of the invention or the mixture of treated pyrolysis oil and transportation fuel is hydrotreated in the presence of heterogeneous catalyst, preferably by hydrodeoxygenation, hydro-dehydrogenation, hydrodesulfurization, hydrodenitrogenation, hydrodearomatisation, hydrodemetallation and/or hydrocracking resulting in hydrotreated pyrolysis oil.

The catalyst used is typically a commonly known catalyst which catalyses hydrodesulfurization (HDS), hydrodeoxygenation (HDO), hydro-dehydrogenation (HDH), hydrodenitrogenation (HDN), hydrodearomatisation (HDA), hydrodemetallation (HDM), hydrogenation, and/or hydrocracking.

The invention will now be illustrated with examples and with reference to the drawings.

One embodiment of the invention is described in FIG. 1. Pyrolysis oil 1 is fed into a first reactor 2 at the same time passing through a heat exchanger. No catalyst material is introduced neither to the pyrolysis oil nor to reactor 2. The first step is carried out in the absence of added catalyst at 100° C. to 200° C. temperature and 50 bar to 250 bar pressure. Optionally a gas 6 comprising at least one of carbon monoxide, hydrogen, nitrogen or mixtures thereof, preferably carbon monoxide, most preferably a mixture of carbon monoxide and hydrogen, is fed into reactor 2. The product of the first step is fed into second reactor 3 at the same time passing through a heat exchanger. No catalyst material is introduced to the product neither from the first step oil nor directly to reactor 3. It is also possible to have only one reactor performing the operation. Thus, reactor 2 and reactor 3 may be the same reactor (illustrated by the dotted lines). The second step is carried out in the absence of added catalyst at 200° C. to 400° C. temperature and 50 bar to 250 bar pressure. Optionally a gas 7 comprising at least one of carbon monoxide, hydrogen, nitrogen or mixtures thereof, preferably carbon monoxide, most preferably a mixture of carbon monoxide and hydrogen, is fed into reactor 3. If the optional different gas atmosphere is used in one or both of reactors 2 and 3, residuals of gas 6 and residuals of gas 7 and possibly other gases formed in the reactors are taken out from the reactors as residual gas 8. The product of the second step is cooled and fed into phase separation unit 4 where the water phase 9 is separated from the oil phase, the treated pyrolysis oil 5. If the process is continuous, two reactors at different temperatures are connected in series and the liquid flow and gas flow through the reactors are optimized.

Figure 2:
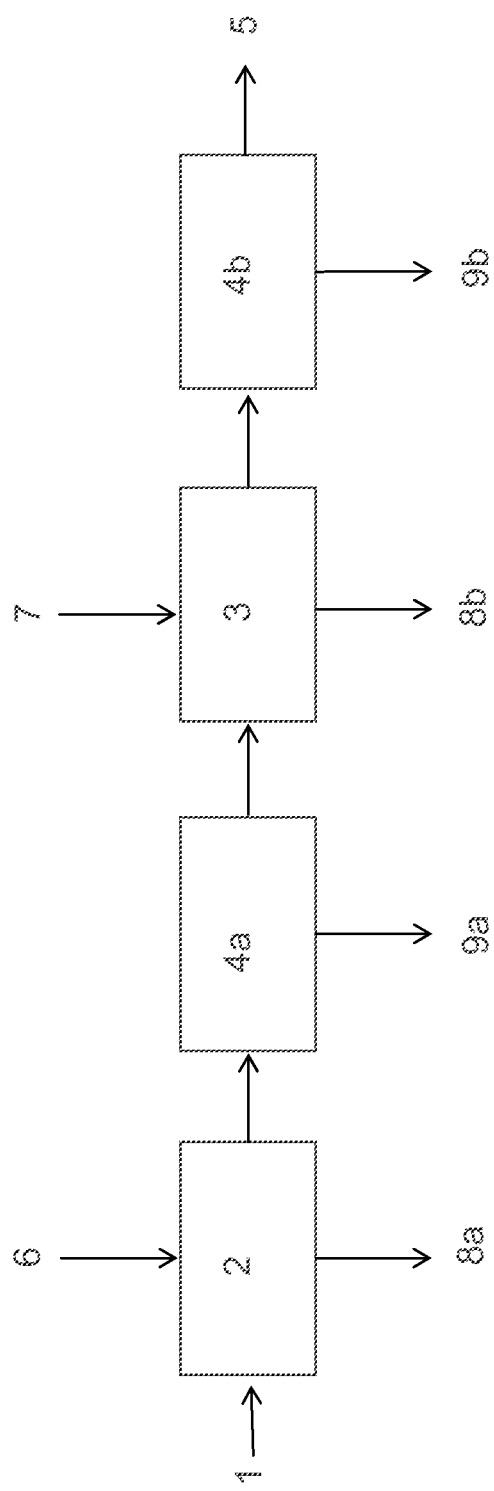
FIG. 2 is another schematic flow diagram representing one embodiment of the invention for upgrading pyrolysis oil.

In another embodiment of the invention described in FIG. 2, pyrolysis oil 1 is fed into first reactor 2 at the same time passing a heat exchanger. No catalyst material is introduced to the pyrolysis oil nor to the reactor 2. The first step is carried out in the absence of added catalyst at 100° C. to 200° C. temperature and 50 bar to 250 bar pressure. Optionally a gas 6 comprising at least one of carbon monoxide, hydrogen, nitrogen or mixtures thereof, preferably carbon monoxide, most preferably a mixture of carbon monoxide and hydrogen, is fed into reactor 2. The intermediate product of the first step is fed into phase separation unit 4a where the water phase 9a is separated from the intermediate product. The intermediate product is fed into second reactor 3 at the same time passing through a heat exchanger. No catalyst material is introduced neither to the intermediate product nor to reactor 2. The second step is carried out in the absence of a added catalyst at 200° C. to 400° C. temperature and 50 bar to 250 bar pressure. Optionally a gas 7 comprising at least one of carbon monoxide, hydrogen, nitrogen or mixtures thereof, preferably carbon monoxide, most preferably a mixture of carbon monoxide and hydrogen is fed into reactor 4. Residuals of gas 6, optionally used for the gas atmosphere of reactor 2, and residuals of gas 7, optionally used for the gas atmosphere of reactor 3, and possibly other gases formed in the reactors are taken out as residual gases 8a, 8b. The product of the second step is cooled and led into phase separation unit 4b where the water phase 9b is separated from the oil phase, the treated pyrolysis oil 5.

Example 1-4

Examples 1-4 are performed according to the process described in FIG. 1. Wood-based pyrolysis oil is fed into reactor at the same time passing through a heat exchanger. The first step is carried out in the absence of added catalyst at the temperature and pressure described in Table 4. A gas described in Table 4 is fed into the reactor and is separated when this step or both steps are completed depending on the number of reactors. The product of the first step passes through a heat exchanger to the second step. The reaction in the second step is carried out in the absence of added catalyst at the temperature and pressure described in Table 4. The same gas as for the first step described in Table 4 is fed into the reactor. The product of the second step is fed into a phase separation unit where the water phase is separated from the oil phase, the treated pyrolysis oil.

TABLE 4

Gas atmosphere, temperatures and pressure of first and second step of examples 1-4

| Example | Atmosphere | Temperature ° C. first step | Temperature ° C. second step | Pressure (bar) |
|---|---|---|---|---|
| 1 | N2 | 100-150 | 300-350 | 200-250 |
| 2 | H2 | 100-150 | 300-350 | 200-250 |
| 3 | CO | 100-150 | 300-350 | 200-250 |
| 4 | H2 + CO (1:1) | 100-150 | 300-350 | 200-250 |

The present invention has been described herein with reference to specific embodiments. It is, however clear to those skilled in the art that the process(es) may be varied within the bounds of the claims.

The invention claimed is:

1. A process for upgrading pyrolysis oil, comprising the non-catalytic steps of
    a) heating said pyrolysis oil in the absence of added catalyst at a temperature of between 100° C. and 190° C. and at the same time a pressure of between 50 bar and 250 bar, and
    b) heating the product of step a) in the absence of added catalyst at a temperature of between 200° C. and 400° C. and at the same time a pressure of between 50 bar and 250 bar.

2. the process according to claim 1, wherein said temperature of step a) is between 100° C. and 150° C.

3. The process according to claim 1, wherein said temperature of step b) is between 300° C. and 350° C.

4. The process according to claim 1, wherein said pressure of step a) and/or step b) is between 150 and 200 bar.

5. The process according to claim 1, wherein step a) and/or step b) are carried out under a gas atmosphere comprising at least one of carbon monoxide, hydrogen, nitrogen or mixtures thereof, preferably carbon monoxide, most preferably a mixture of carbon monoxide and hydrogen.

6. The process according to claim 1, wherein said step a) and said step b) are carried out in separate reactors under same or different gas atmosphere.

7. The process according to claim 1, wherein the process further comprises a step of
    c) separating a water phase from an intermediate product.

8. The process according to claim 7, wherein the process further comprises a step of
    d) recovering treated pyrolysis oil.

9. A method for producing electricity, comprising feeding the recovered treated pyrolysis oil according to claim 8 to a power plant.

10. A method for producing heat, comprising burning the recovered treated pyrolysis oil according to claim 8 in a boiler.

11. A method of hydrodeoxygenation comprising hydrotreating the recovered treated pyrolysis oil according to claim 8 in the presences of a heterogeneous catalyst.

12. A transportation fuel comprising the recovered treated pyrolysis oil according to claim 8.

13. The transportation fuel according to claim 12, further comprising gasoline or diesel fuel.

14. The process according to claim 8, wherein the process further comprises a step of
    e) mixing said treated pyrolysis oil with transportation fuel or mineral oil to produce a mixture.

15. The process according to claim 14, wherein the treated pyrolysis oil of step d) or the mixture of mineral oil and treated pyrolysis oil of step e) is hydrotreated in the presence of heterogeneous catalyst, preferably by hydrodeoxygenation, hydro-dehydrogenation, hydrodesulfurization, hydrodenitrogenation, hydrodearomatisation, hydrodemetallation and/or hydrocracking.

16. The process according to claim 15, wherein the hydrotreated pyrolysis oil is fractionated.

17. A product obtained by the process according to claim 1.

18. A method for producing transportation fuel, comprising obtaining the recovered treated pyrolysis oil according to claim 15 or blending the recovered treated pyrolysis oil according to claim 8 with a transportation fuel, preferably in gasoline or diesel fuel.

* * * * *